June 3, 1969   I. BALAN ET AL   3,447,624
VEHICLE SPEED REGULATING ARRANGEMENT
Filed April 26, 1967   Sheet 1 of 6

INVENTORS.
Isadore Balan,
Ian J. C. Scott
BY Harness, Talburtt & Baldwin
ATTORNEYS

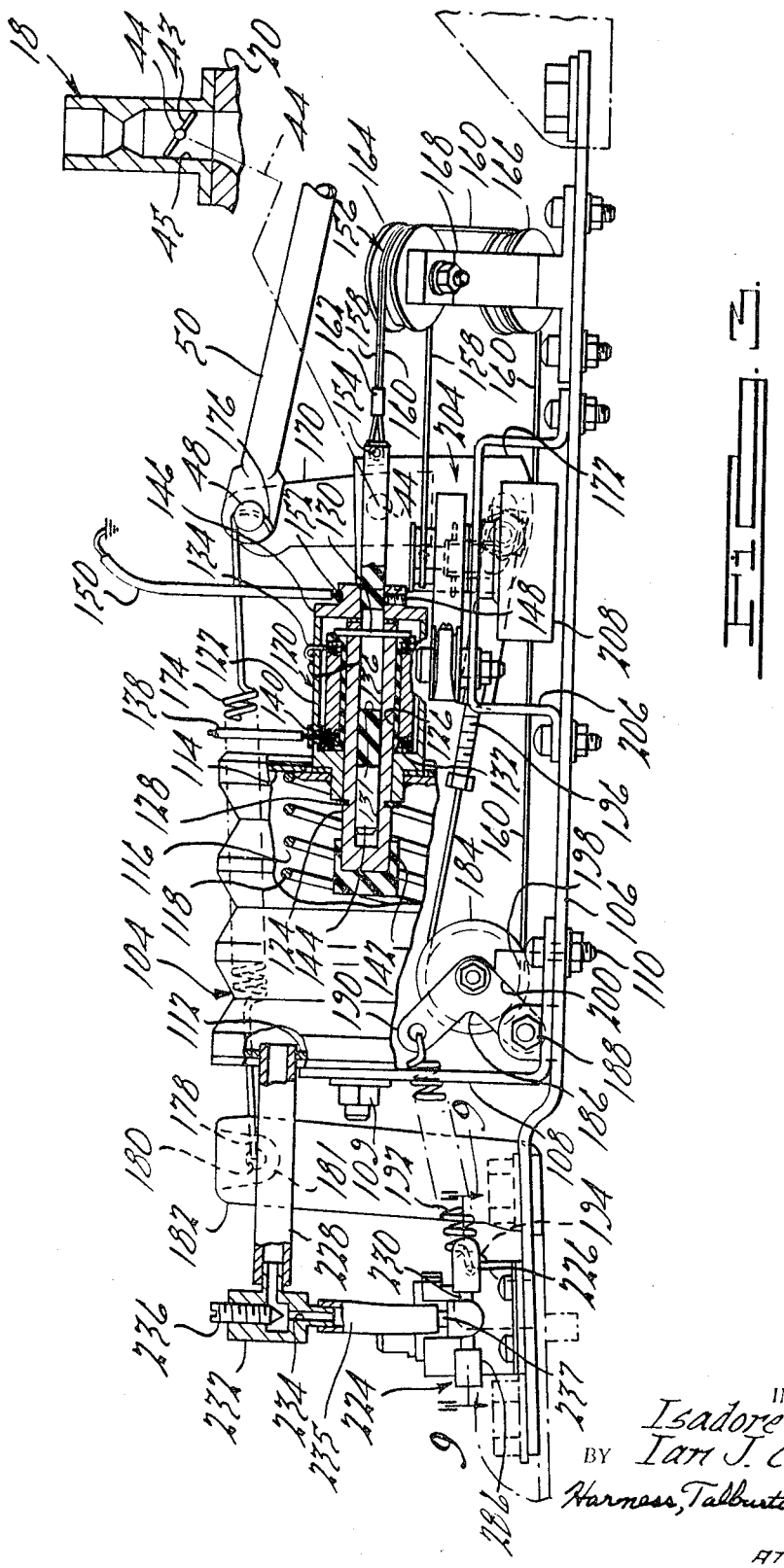

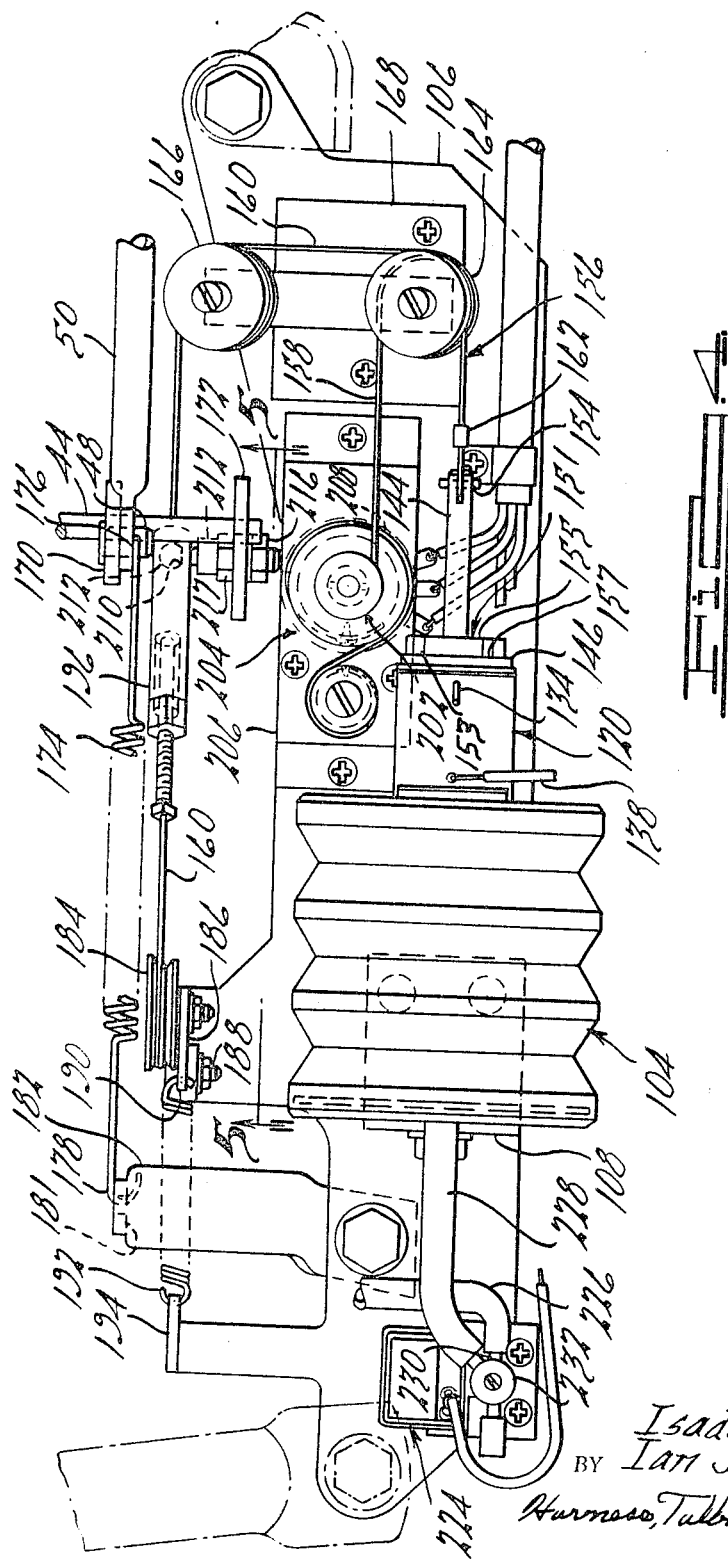

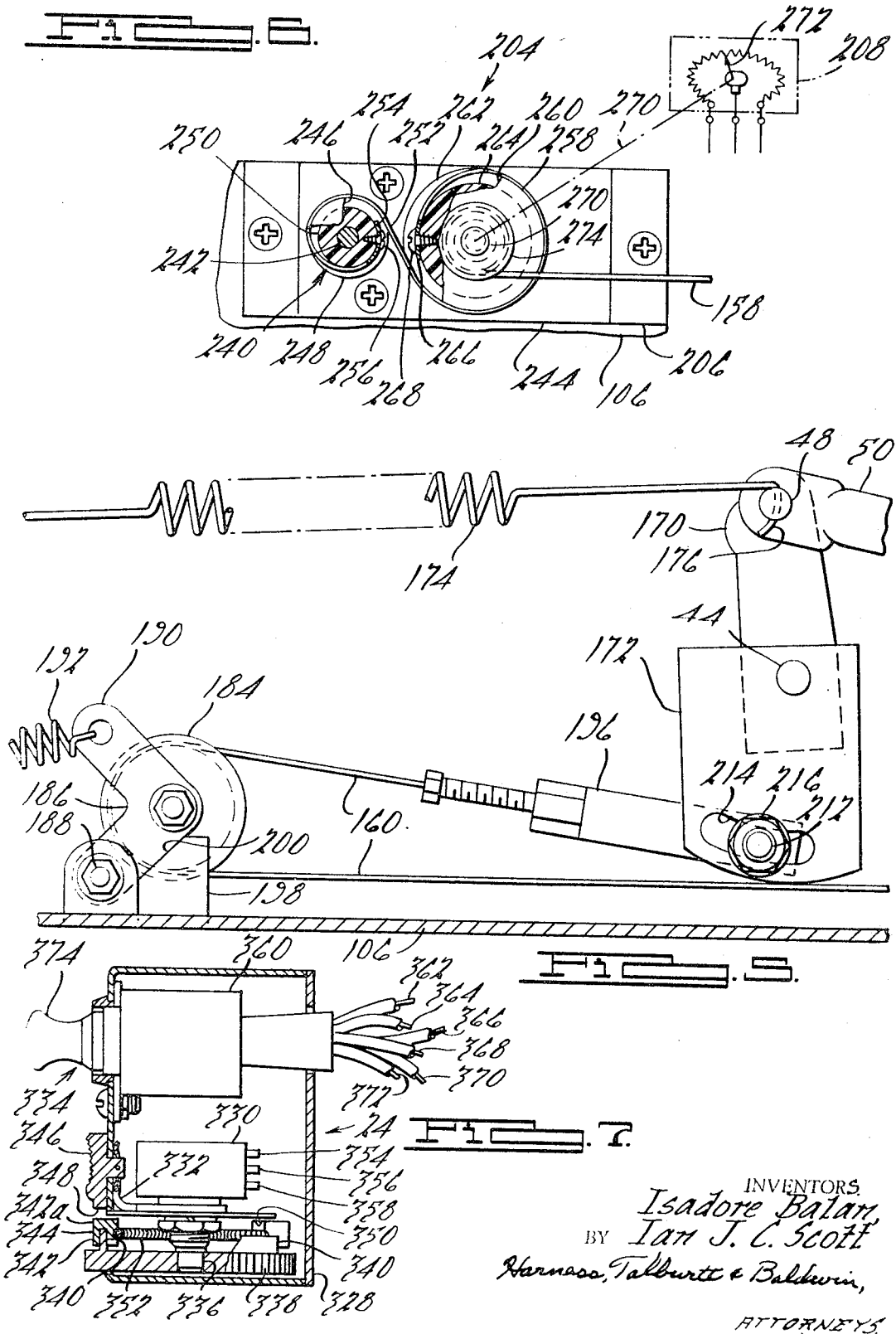

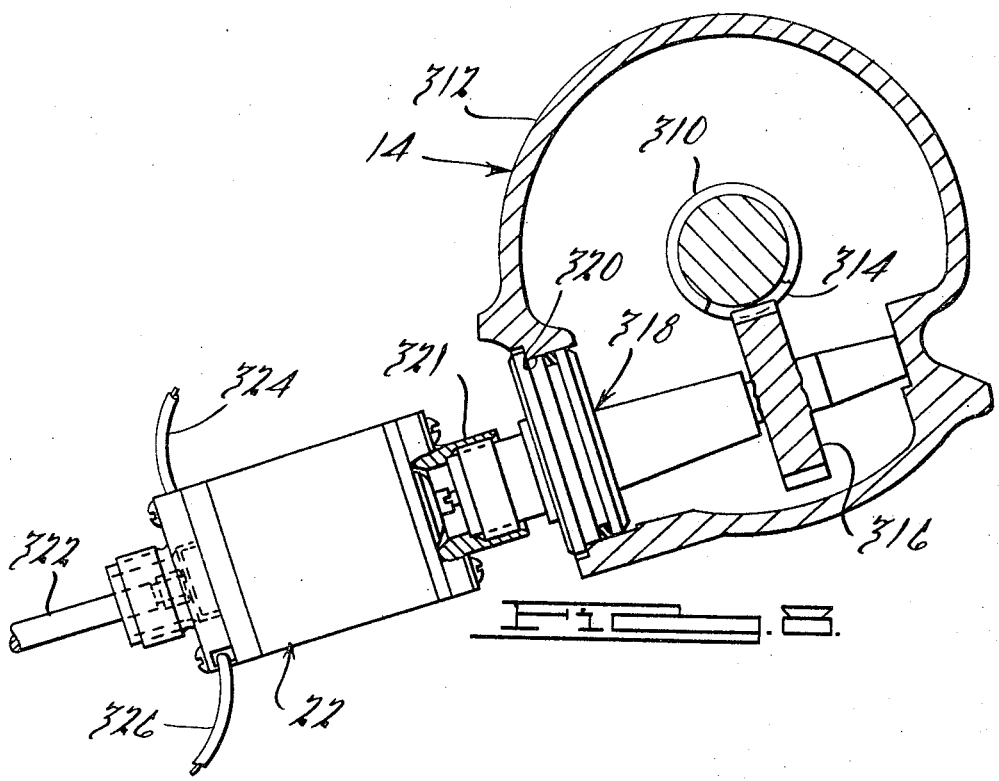
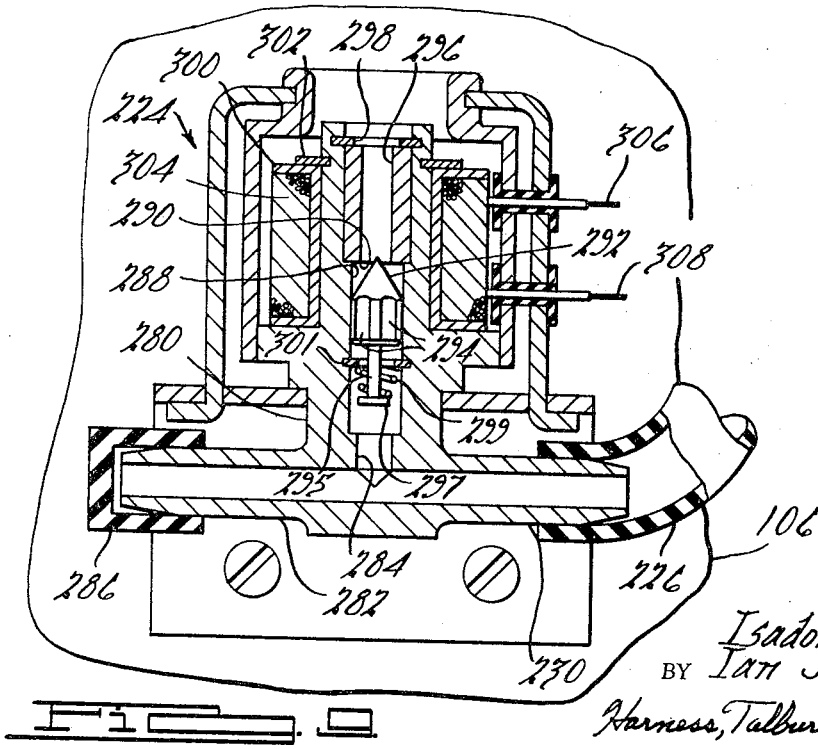

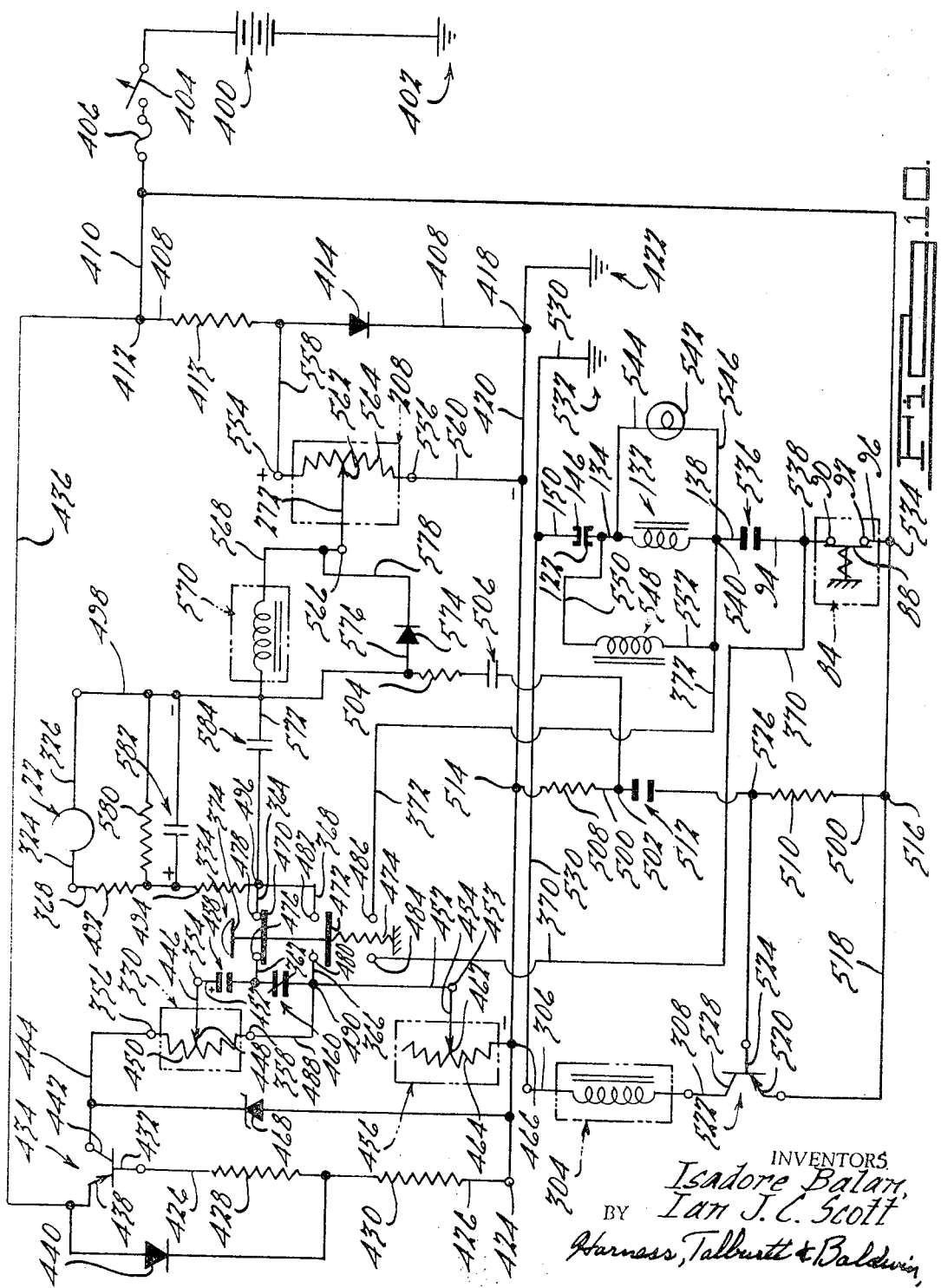

United States Patent Office 3,447,624
Patented June 3, 1969

3,447,624
VEHICLE SPEED REGULATING ARRANGEMENT
Isadore Balan, Oak Park, and Ian J. C. Scott, Madison Heights, Mich., assignors to Chrysler Corporation, Highland Park, Mich., a corporation of Delaware
Filed Apr. 26, 1967, Ser. No. 633,836
Int. Cl. B60k 27/00, 33/00; F02d 11/02
U.S. Cl. 180—105         5 Claims

ABSTRACT OF THE DISCLOSURE

A vehicle having an internal combustion engine with an intake manifold and throttle valve is provided with a vacuum bellows, actuated by intake manifold vacuum, connected to the throttle valve for varying the position of the throttle valve in order to maintain a selected vehicle speed. An operator request signal, generated by a first potentiometer, and a vehicle speed signal, produced by a generator driven in accordance with vehicle speed, are compared and the difference therebetween is directed to a relay which when energized actuates a two-position solenoid-operated valve for directing manifold vacuum to the bellows. When the relay is not energized the valve assumes its other position which vents the bellows to atmosphere. The two position valve keeps moving back-and-forth in order to achieve the required degree of vacuum within the bellows. A feed-back potentiometer operatively connected to the throttle valve serves to produce a feed-back signal which is correlated to the position of the throttle valve. The feed-back signal is directed against the relay in a direction which opposes the difference between the operator request signal and the vehicle speed signal.

BACKGROUND OF THE INVENTION

In the past, various devices were proposed by which vehicle speed could be regulated for a selected speed. However, almost all of these devices which employed electrical circuitry required highly sensitive and expensive components. For example, many of such prior art devices required expensive proportioning valves and solenoids for proportioning and metering the flow of actuating fluids within the speed controlling system. The complexity and cost of such systems made them prohibitive for general application to vehicles and virtually impossible for application to vehicles once the vehicles were manufactured and sold by the original vehicle builder.

SUMMARY OF THE INVENTION

The present invention includes a vehicle speed regulating arrangement, for a vehicle equipped with an internal combustion engine having an intake manifold and throttle valve, wherein a vacuum actuated bellows is operatively connected to the throttle valve. An electrical signal, produced by comparing a vehicle operator speed request signal and a vehicle actual speed signal, is directed to a relay which upon energization causes a two-way solenoid valve to move to a position completing communication between the bellows and manifold vacuum. The relay, upon de-energization, permits the solenoid valve to move to a position permitting the interior of the bellows to be at least partially ported to atmosphere. The solenoid valve, in this manner determines the pressure value within the bellows so as to provide the proper contraction of the bellows and movement of the throttle valve. A feed-back potentiometer operatively connected to the throttle valve produces a feed-back voltage correlated to the position of the throttle valve. The feed-back voltage signal is directed to the relay in a direction opposing energization of the relay.

Accordingly, an object of this invention is to provide a vehicle speed regulating arrangement capable of maintaining said vehicle at any preselected speed within a range of speeds.

Another object of this invention is to provide a vehicle speed regulating arrangement which has manually actuable means for automatically reducing the speed of the vehicle from a higher preselected regulated speed to a lower previously established minimum regulated speed to a lower previously established minimum regulated speed in order to provide a retarding effect on the vehicle without having to use the vehicular braking system.

Other objects and advantages of this invention will become apparent when reference is made to the following description considered in conjunction with the drawings.

DESCRIPTION OF THE DRAWINGS

In the accompanying drawings:

FIGURE 3 is an elevational view, with portions thereof broken away and in cross-section, of one of the components illustrated in FIGURE 2;

FIGURE 4 is a top plan view of the arrangement illustrated in FIGURE 3;

FIGURE 5 is a fragmentary elevational view taken generally on the plane of line 5—5 and looking in the direction of the arrows;

FIGURE 6 is an enlarged top plan view, with portions thereof broken away and in cross-section, of a portion of the device illustrated in FIGURE 4;

FIGURE 7 is an enlarged view, with portions thereof broken away and in cross-section, of one of the components illustrated in FIGURE 2;

FIGURE 8 is an enlarged view, with part of the drive train of FIGURE 1 in cross-section, of one of the components illustrated in FIGURE 1;

FIGURE 9 is an enlarged cross-sectional view taken generally on the plane of line 9—9 of FIGURE 3 and looking in the direction of the arrows; and FIGURE 10 is a schematic wiring diagram of the overall speed regulating arrangement.

DESCRIPTION OF THE PREFERRED EMBODIMENT

Figure 1:
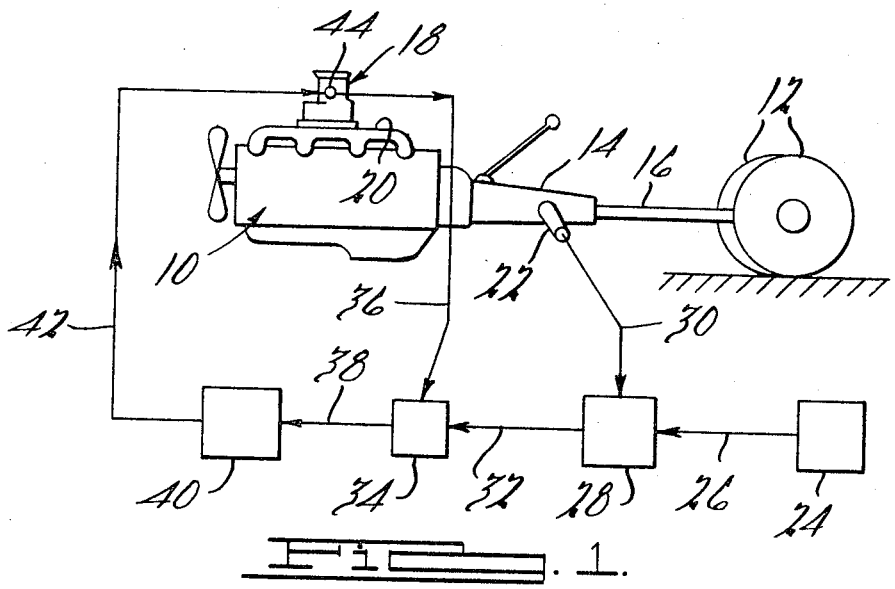
FIGURE 1 illustrates in simplified schematic block diagram the functional interrelationship of the various components comprising the invention in association with an automotive engine, drive train and ground contacting wheels.

Referring now in greater detail to the drawings, FIGURE 1 illustrates an automotive vehicle having an internal combustion engine 10 for propelling the vehicle by means of ground-engaging wheels 12. A suitable transmission mechanism 14 is operatively connected to the engine 10, at one end, and to a cooperating drive shaft 16 which, through suitable means, drives wheels 12. The engine 10 is also provided with a carburetor 18 situated on an engine intake manifold 20. Preferably, transmission 14 carries a vehicle speed sensing means such as a tachometer generator 22 which is operatively engaged with the transmission output shaft.

FIGURE 1 also illustrates in simplified schematic block diagram the functional interrelationship of the various components comprising the invention. For example, means for receiving an operator request, illustrated at 24, creates an input signal as depicted at 26. The input signal is fed into a comparator arrangement 28 which also receives a signal 30 of the actual vehicle speed from speed sense 22. The comparator 28 compares the request signal 26 to the actual speed signal 30 and on the basis of the difference therebetween creates an output signal 32 which is directed to a second means 34 for comparing the actual position of the carburetor throttle valve to the position of the throttle valve as dictated by the output or resultant signal 32. Suitable means operatively connected to the carburetor throttle valve create a feed back signal as at 36 to the secondary comparator 34 which on the basis of comparing signal 36 and signal 32 creates an output signal 38 directed to carburetor throttle positioning means 40. The throttle positioning means 40 by means of suitable motion transmitting means 42 then positions the carburetor throttle which is mounted on the throttle shaft 44.

Figure 2:
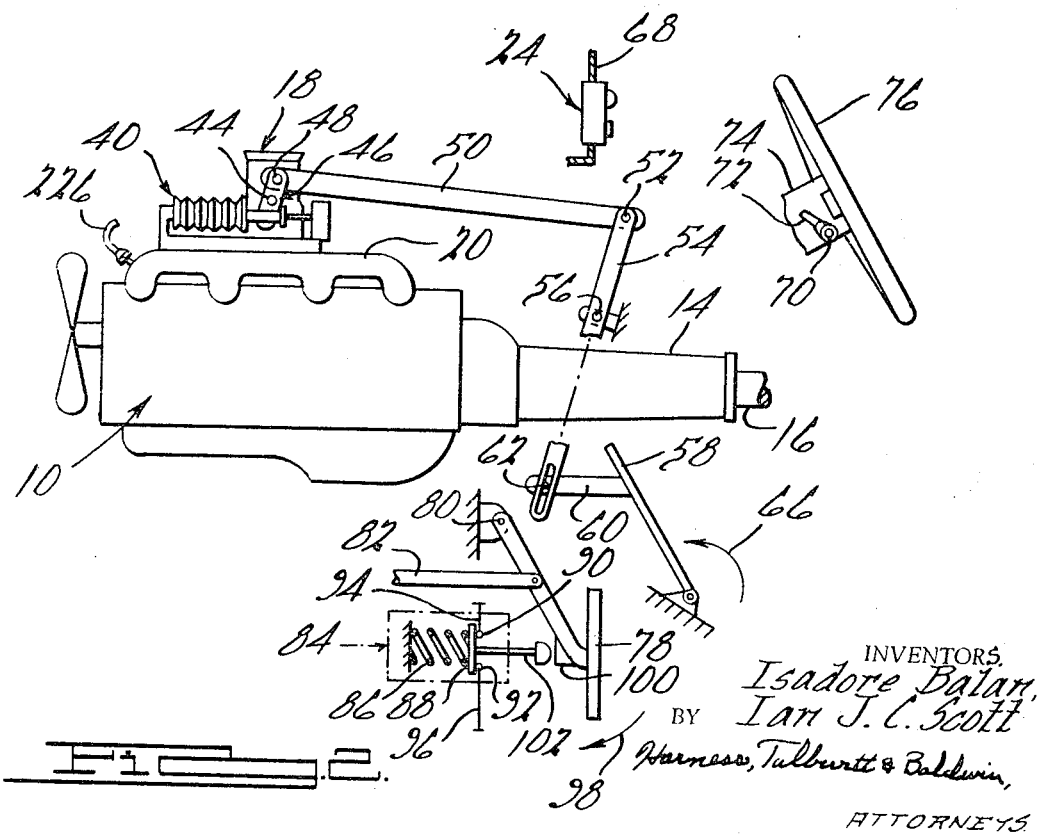
FIGURE 2 illustrates, in somewhat a fragmentary pictorial representation, the various components involved in the overall invention.

FIGURE 2 illustrates in somewhat a fragmentary pictorial representation the various components involved in the overall invention. That is, the throttle positioning means 40 is illustrated generally as being a vacuum bellows assembly suitably mounted as on the engine 10 and operatively connected as by lever means 46 to the carburetor throttle shaft 44. Lever means 46 is also connected by an upper pivot connection 48 to a linkage 50 which has its other end secured by a pivot 52 to a lever 54. A pivotal support 56 is provided for lever 54 generally between the ends thereof. A pivoted operator positioned foot throttle pedal 58 is operatively connected to the opposite end of lever 54 as by means of an arm 60 secured thereto and a sliding pivotal connection 62. Rotation of pedal 58 in the direction of arrow 66 causes the throttle valve to move toward a more fully opened positioned thereby supplying greater quantities of a combustible mixture to the intake manifold 20 and engine 10.

The speed selector and governor actuator 28 may be mounted on the vehicle dash panel 68. However, as will become evident, if desired, the actuator for engaging the vehicle speed governor may be included as a push button 70 within the end of a lever such as a directional turn signal lever 72 carried by the vehicle steering column assembly which is fragmentarily illustrated at 74. In such a case the lever 72 would be in relatively close proximity to the vehicle steering wheel 76.

A vehicle brake system actuating pedal 78 suspended from a pivotal support 80 is adapted to actuate an associated braking system by means of a motion transmitting rod 82 and is further adapted to actuate an electrical switch assembly 84 which is normally closed as by a spring 86 biasing a movable contact 88 against stationary contacts 90 and 92 which are electrically connected to conductors 94 and 96, respectively. As brake pedal 78 is moved in the brake-applying direction, indicated generally by arrow 98, suitable means, such as an abutment 100, engages a plunger member 102 causing the plunger and contact 88 to move to the left thereby opening the circuit as between contacts 90 and 92. Plunger 102 may be made of electrically non-conducting material or it may be secured to contact 88 in electrically insulated relationship thereto.

The carburetor throttle positioning means 40 as well as the means for creating the feed-back signal 36 (FIGURE 1) are illustrated in greater detail by FIGURES 3 and 4. FIGURE 3 is an elevational view with portions thereof broken away and in cross-section. With reference to both FIGURES 3 and 4, it can be seen that a bellows 104 is secured to a base member 106 through a generally L-shaped support bracket 108. A suitable threaded fastener 109 may be employed for securing the bellows 104 to bracket 108 while fasteners, such as screws 110, may be employed for securing the support bracket 108 to base 106.

End wall 112 of bellows 104 is, of course, secured against movement to bracket 108; however, opposite end wall 114 is permitted to move to the left, from the position shown, whenever the pressure within the interior 116 of bellows 104 is sufficiently reduced. Such movement of wall 114 to the left will be incremental because it has to move against the resilient resistance presented by compression spring 118 which effectively abuts, internally, against end walls 112 and 114.

Bellows end wall 114 has a coil assembly 120 secured thereto in any suitable manner so as to be movable with the end wall 114. The coil assembly 120 is generally comprised of an outer housing 122 (which is either electrically conductive or has a conductive path formed thereon) which carries a generally internally disposed sleeve-like or bushing member 124. A spool 126 is carried by bushing 124 so as to be internally of housing 122 and externally of bushing 124. Sleeve member 124 is precluded from movement relative to housing 122 by any suitable means such as, for example, a spring-like retainer clip 128 and a pin 130 which extends through bushing 124 and is suitably secured therein. An electrical coil 132 is wound on spool 126 and has one end 134 electrically connected to housing 122 as at 136. The other end 138 of coil 132 passes through housing 122, in insulated relationship thereto as at 140. An insulating abutment member 142 is preferably carried at the end of sleeve 124 in case wall 114 should ever move so far to the left as to require a stop member to abut against the opposite wall 112.

An electrically non-conductive cylindrical rod 144, slidably received within bushing 124, carries a solenoid shoe 146 affixed thereto as by a set screw 148. Rod 144 has a slot 131 formed therethrough which closely receives in sliding relationship, the central portion of pin 130. Solenoid shoe 146, preferably metallic and electrically conductive, has an electrical conductor 150 electrically connected thereto as at 152. The conductor 150 is at ground potential. Normally, shoe 146 and solenoid assembly 120 are separable from each other; however, during certain operating conditions when shoe 146 and solenoid housing 122 are brought into engagement with each other, electrical current supplied through conductor 138 energizes the coil windings 132 and flows through end 134 into solenoid housing 122 and then to shoe 146 and finally through conductor 150 into ground. It should be evident that at this time solenoid housing 122 and shoe 146 are functioning as electrical contacts in the completion of an electrical circuit. Further, since the housing 122 and shoe 146 complete the circuit through the solenoid coil 132, it can be seen that the arrangement is a "self-holding" solenoid assembly because the field of coil 132 keeps shoe 146 in contact with solenoid housing 122.

Normally, bellows 104 is expanded by spring 118 so as to cause wall 114 to carry solenoid assembly 120 and shoe 146 to an extreme position to the right against a fixed abutment which is of a generally yoke-like configuration and secured to base 106. Abutment yoke 151 is not shown in FIGURE 3 for purposes of clarity; however, in the top plan view of FIGURE 4 the upwardly extending yoke arms 153 and 155 can be seen engaging surface 157 of solenoid shoe 146 and thereby precluding any further motion thereof to the right.

The other end of rod 144 has secured thereto, as by a cross-pin 154, a cable assembly 156 looped about pin 154 so as to form separate operating cables 158 and 160. A suitable crimping or holding device 162 may be provided to preclude slipping or relative movement between cables 158 and 160.

Pulleys 164 and 166 are mounted on a suitable pedestal 168 which is, in turn, secured to base 106. Pulley 164 has a double track in order to accommodate both cables 158 and 160 whereas pulley 166 need only have a single track to accommodate cable 160. As can be determined from both FIGURES 3 and 4, pedestal 168 maintains pulleys 164 and 166 in a somewhat inclined position.

As is schematically illustrated, throttle valve 43 is mounted on throttle shaft 44 within the induction passage 45 of carburetor 18. Clockwise rotation of throttle shaft 44, and therefore throttle valve 43, results in increased flow of motive fluid to the intake manifold 20 and engine 10. As previously mentioned suitable throttle lever means 46 (FIGURE 2) are also secured to throttle shaft 44 in a manner precluding relative rotation therebetween. The throttle lever means 46 may take the form of separate throttle levers 170 and 172 each so secured to throttle shaft 44 as to preclude relative movement therebetween. As can be seen in both FIGURES 3 and 4, throttle lever 170 has throttle linkage 50 (see also FIGURE 2) pivotally secured thereto by a pin 48 (see also FIGURE 2). A tension spring 174 has one end 176 hooked through an opening formed in pin 48 and may, as best seen in FIGURE 4, thereby preclude throttle linkage 50 from slipping off of pin 48. The other end 178 of spring 174 is hooked through an aperture 180 formed in a tab portion 181 of a bracket 182 secured to the base 106. The force of spring 174 is such as to always return throttle valve 43 to its closed position whenever other controls are not maintaining throttle valve in any open condition.

A third pulley 184 is mounted on an arm 186 which is pivoted at one end, as at 188, and which also has its other end 190 operatively connected to a tension spring 192. The other end of spring 192 is operatively anchored to a tab 194 provided by base 106. Cable 160, which passes over both pulleys 164 and 166, is looped around pulley 184 and terminates in a suitable clip-like connector or fastener 196. The connector 196 is then operatively connected to the other throttle lever 172. Spring 192 is relatively weak and its primary purpose is to maintain a degree of tension in cable 160. A stop block 198 having an abutment surface 200 is also provided in order to limit the possible clockwise rotation of arm 186 about its pivot 188. As shown in FIGURE 3, abutment surface 200 is in the direct path of travel of arm 186. The force of spring 192 is, of course, not sufficient to cause throttle valve 43 to open against the closing force of spring 174.

As can be seen by both FIGURES 3 and 4, cable 160 and cable 158 are both secured to sliding rod 144. However, while cable 160 is eventually secured to throttle lever 172, cable 158 is secured at 202 to a negator spring drive assembly 204 which is mounted on a generally U-shaped bracket 206 and is operatively engaged to a feedback potentiometer 208 located generally between bracket 206 (and supported therefrom) and base 106. The purpose of the negator spring drive assembly 204 is to provide a constant force against cable 158 in order to eliminate all backlash in the cable drive arrangement so as to assure the wiper within the potentiometer 208 to assume positions accurately reflecting the position of the slidable rod 144. The negator spring drive assembly is illustrated in greater detail in FIGURE 6. However, for the time being it is sufficient to merely say that the negator assembly provides such an additional constant force so as to eliminate back-lash.

Referring in greater detail to FIGURES 4 and 5, it can be seen that cable 160 is secured to a connector 196 which has an aperture 210 at the end thereof for receiving a ball type pin member 212. Pin member 212 is in turn secured to throttle lever 172 within a generally arcuate bean slot 214 as by threaded nut members 216 and 217 which are oppositely disposed about lever 172. Bean slot 214 is provided in order to enable the adjustment of pin 212 generally arcuately about the centerline of throttle shaft 44. In view of the above, it can be seen that whenever bellows 104 causes latching solenoid assembly 120 and shoe 146 to move to the left, as viewed in either FIGURE 3 or 4, throttle shaft 44 and throttle valve 43 will be rotated toward the open throttle position, through cable 160, against the resistance of spring 174.

Referring now in greater detail to FIGURES 3, 4 and 6, the negator spring drive assembly 204 is illustrated as being comprised of a relatively smaller spool or drum 240 which is pivotally mounted and secured by a fastener 242 to the bight portion 244 of the U-shaped bracket 206. Spool 240 has upper and lower circular flanges 246 and 248 which are formed generally by an axially intermediate cylindrical surface 250 of a diameter less than that of flanges 246 and 248.

The negator spring 252 is formed so as to be very thin in comparison to its width. Further, spring 252 is so formed as to, in its free state, coil itself about and against the outer diameter of spool or drum flanges 246 and 248. The inner end 254 of the coiled spring 252 may be secured to the drum or cylindrical surface 250 as by a screw 256. End 254 is preferably of a width less than the distance between flanges 246 and 248 thereby forming a tongue-like portion received between said flanges. The tongue-like end 254 permits it to be fastened on cylindrical surface 250 while enabling the major portion of the spring to lie against the outer diameter of flanges 246 or 248. For purposes of clarity spring 252 has been illustrated as only forming a partial coil about drum 240; however, it should be apparent that where in practice greater movement of spring 352 and drum 240 is required, spring 252 would be of a length sufficient to form a plurality of coils about drum 240.

The negator spring drive assembly 204 also includes a second drum or reel 258 which, similarly to drum 240, has upper and lower circular flanges 260 and 262 formed generally by an axially intermediate cylindrical surface 264 of a diameter less than that of flanges 260 and 262.

Negator spring 252 is wrapped around the outer diameter of flanges 260 and 262, in a manner similar to drum 240, and the other end 266, also of a reduced width and tongue-like configuration, is secured as by a screw 268 to the cylindrical surface 264.

Drum 258 is fixedly secured, by any suitable means to a rotatable shaft 270 which extends downwardly through the bight 244 of bracket 206 and into the potentiometer 208 so as to be in operative engagement with the wiper arm 272. As shaft 270 is caused to rotate corresponding rotation of potentiometer wiper arm 272 is achieved. Situated atop drum 258 is another spool-like drum 274 upon which cable 158 is partially wound. Cable 158 may be secured thereto in any suitable manner which results in corresponding movement between drum 274 and cable 158.

As cable 158 is moved, for example, to the right, drum 258 is rotated counter-clockwise causing more of springs 252 to unwind from drum 240 which is being rotated clockwise. As previously mentioned, spring 252, in its free state, would coil itself about drum 240. The forcing of the spring 252 to coil in an opposite direction onto drum 258 results in a constant resisting force developed by spring 252 tending to make itself coil back onto the drum 240. This constant resisting force is employed to eliminate all backlash because cable 158 is maintained taut at all times even though there is no increase in resistance from spring 252 as cable 158 is pulled further to the right.

Referring to FIGURES 2 and 3 it can be seen that a conduit 228 communicates at one end with the interior 116 of bellows 104 and at the other end with the interior of valve housing 232. A manually adjustable screw 236 varies the restrictive effect to flow through conduit portion 234 of valve housing 232. A second conduit 235 has its opposite ends communicating respectively with conduit portion 234 and conduit portion 237 of a solenoid-operated valve assembly 224. Further, a second conduit portion 230 formed on valve assembly 224 has a conduit 226 connected thereto; conduit 226 has its other end, as shown in FIGURE 2, in communication with the interior of engine intake manifold 20 so as to be in continual communication with the vacuum generated therein.

FIGURE 9, a cross-sectional view, taken on line 9—9 of FIGURE 3, illustrates solenoid valve assembly 224 as having a main body portion 280 provided with conduits 230, 282 and 284. As can be seen conduits 282, 230 and 284 are in communication with each other. Conduit portion 237, above the section plane 9—9 in FIGURE 3, is also in communication with each of conduits 282, 230 and 284. Conduit 282 is illustrated as being closed to atmosphere as by a suitable sealing cap 286 while conduit 230 is continually exposed to engine manifold vacuum by virtue of conduit 226. Conduit 237, of course, is in continual communication with the interior 116 of bellows 104 as illustrated in FIGURE 3.

Body 280 also has formed therein an enlarged cylindrical passageway 288 which communicates with conduit 284 and slidably receives a valve member 292. A valve seat 290 is provided by a cylindrical tubular insert 296 which may be held in place as by a spring snap ring 298. Valve 292 may be fluted or provided with flatted portions 294 so as to permit the free flow of atmospheric air between the valve 292 and the wall surface of passageway 288 whenever the valve 292 is in its illustrated open position. The valve 292 is also provided with a stem 295 and stem head 297 against which a compression spring 299, seated on a snap ring spring perch 301, acts to normally keep the valve 292 away from seat 290.

A spool 300 situated about body 280 and retained thereon as by a spring snap ring 302 carries an armature winding 304 which has electrical leads 306 and 308 for connection to electrical circuitry to be described. Whenever the circuitry is completed through electrical leads 306 and 308 the resulting field of armature coil 304 causes valve 292 to seat itself against the seat 290 of insert 296 thereby terminating further communication therethrough with the atmosphere and simultaneously completing communication between the manifold vacuum conduit 226 and conduit 237 which communicates with the interior 116 of bellows 104.

FIGURE 8, an enlarged cross-sectional view taken generally transversely to the transmission 14 of FIGURE 1 and extending through the centerline of generator 22, illustrates the transmission output shaft 310, contained within transmission housing 312, having a worm thread 314 formed thereon and in operative engagement with a driven gear element 316. Gear element 316 is suitably secured to a rotatable shaft of an adapter assembly 318 secured within a bore 320 of the housing 312. The adapter 318 and rotatable shaft are operatively connected to an electrical generator 22 as by a coupling 321. The other end of electrical generator 22 is also operatively connected to a cable member 322 which, at its other end, drives the vehicle speedometer and odometer (not shown). Generator 22 has output leads 324 and 326 which are connected in the circuitry of FIGURE 10. Generator 22, as previously described, provides a voltage at leads 324 and 326 which corresponds to vehicle speed.

FIGURE 7 illustrates, in greater detail, the means 24 for creating an operator request signal as comprising an outer housing 328 in which is carried a potentiometer 330, mounted to the housing by an L-shaped bracket 332, and a manually depressable push-button type switch 334. Potentiometer 330 has its center electrical wiper element operatively connected to a rotatable shaft 336 which extends downwardly and has fixedly secured thereto a manually positionable thumb wheel 338. A continuous cylindrical wall portion 340, has mounted thereon a plurality of movable visual indicators 342 which have on their respective outer faces 344 numbers indicating selected governed vehicle speed. Each of the indicators is movable on wall 340 so as to provide a ready means for synchronizing actual vehicle speed to the speed indicated as selected. That is, for example, if indicator 342a should carry a number, 50, on its outer face 344 and the vehicle is actually traveling at 55 miles per hour, a depressable indexing member 346 is lowered so as to have its pointer end 348 engage a center notch 350 of the indicator. With member 346 and indicator 342a so engaged, thumb wheel 338 is slowly rotated towards the slower vehicle speed direction until vehicle speed, as shown by the vehicle speedometer, corresponds to the number 50 on the face 344 of indicator 342a. The indexing member may then be raised to the position illustrated and subsequent movement of thumb wheel 338 will result in corresponding movement of the indicators 342 because of the radially outward resilient force provided by the coiled spring 352 urging each of the indicators 342 into frictional engagement with wall 340.

Push button switch 334 is basically comprised of an outer housing 360 which contains a resiliently biased depressable plunger 374 carrying a plurality of electrical contacts adapted for engagement with other stationary contacts within housing 360. The push button switch assembly 334 is schematically illustrated in FIGURE 10. Electrical leads 362, 364, 366, 368, 370 and 372 as well as electrical leads 354, 356 and 358 of potentiometer 330 are included within the circuitry of FIGURE 10.

In the circuitry of FIGURE 10, a suitable source of electrical potential 400 has one terminal connected to ground 402 and has its other terminal connected in series with the vehicle ignition switch 404. A fuse 406 may be in series with the ignition switch. A conductor 408 connected to the fuse 406 by a conductor 410, as at 412, has in series a resistor 413 and a diode 414. Diode 414 is forwardly biased so as to in substance provide a substantially constant voltage across potentiometer 208. One terminal end of conductor 408 is connected as at 418 to a conductor 420 which has one end at ground potential as at 422 and its other end connected as at 424 to a conductor 426 which contains series resistors 428 and 430. The other end of conductor 426 is connected to the base electrode 432 of a P-N-P transistor 434. Conductors 410 and 408 are connected as at 412 to a conductor 436 which leads to the emitter electrode 438 of transistor 434. A forwardly biased diode 440 is connected to both conductors 436 and 426 in a manner so as to be in parallel to the emitter-base circuit including resistor 428. Diode 440 functions to provide a substantially constant voltage across the emitter-base circuit of transistor 434.

Collector electrode 442 of transistor 434 is electrically connected as by conductor 444 to terminal lead 356 of the speed setting or selecting potentiometer 330 (also shown in FIGURES 7, 3 and 2). Potentiometer wiper arm 446, which has its contact end 448 in engagement with the resistance coil 450, has its terminal lead 354 electrically connected to a conductor 452 which has its other end connected to a terminal lead 453 of the wiper arm 454 of a minimum governed speed potentiometer 456. The contact end 462 of wiper arm 454 engages resistance coil 464 which has one end connected to conductor 420 as at 466. A Zener diode 468 is connected across conductors 444 and 420 so as to be generally parellel with wiper 446, conductor 452, wiper 454 and resistance 464. The Zener diode 468 is used to generate a reference voltage through the transistor 434 since it possesses characteristics of voltage regulation. This combined with the transistor 434 which provides substantially constant current results in a system which provides both current and voltage of closely maintained values to the speed setting potentiometer 330. Conductor 452 also carries serially arranged relay operated contacts 458 and 460. Contacts 458, as indicated are normally open while contacts 460 are normally closed.

Push button plunger 374 of switch assembly 334 carries bridging contacts 470 and 472. Normally, a spring schematically illustrated at 474, maintains push button plunger 374 in its upper-most position thereby maintaining bridging contact 470 in engagement with contacts 476 and 478. Contact 476 and conductor 362 are electrically connected to conductor 452 at a point intermediate relay-operated contacts 458 and 460. Whenever plunger 374 is fully depressed, bridging contact 470 engages contacts 480 and 482 of conductors 366 and 368, respectively, while bridging contact 472 engages contacts 484 and 486 of conductors 370 and 372, respectively. Conductor 366 as well as conductor 488 (connected to terminal lead 358 of potentiometer 330) are connected to conductor 452 as at 490.

Terminal lead 324 of vehicle speed signal generator 22 is connected to conductor 368 which has, at its other end, contact 482. Further, a plurality of resistors 492 and 494 are serially connected in conductor 368. Resistor 492 is preferably a thermistor so as to provide automatic compensation within the circuitry for changes in temperature. Conductor 364 also connects contact 478 to conductor 368 as at 496. The other terminal lead 326 of generator 22 is connected to a conductor 498 which is connected at its other end to a conductor 500 as to 502. Conductor 498 contains, in serial relationship, a resistor 504 and capacitor 506, while conductor 500 contains, also in series circuit, resistors 508 and 510 with a set of relay-operated contacts 512 therebetween.

Resistor 504 and capacitor 506 combine to form a transient feed-back network which assists in closing of the relay-operated contatcs 512. That is, when contacts 512 close there is a tendency for them to bounce open. Accordingly, when contacts 512 first touch the current from resistor 508 charges the capacitor 506 through resistor 504 sufficiently to cause a substantially instantaneous increase in current flow through the winding of polarized relay winding 570 so as to assist in maintaining contacts 512 and thereby prevent the contacts 512 from bouncing open.

One end of conductor 500 is connected to conductor 420, as at 514, while its other end is cònnected, at 516, to a conductor 518 which has its opposite ends respectively connected to conductor 410 and the emitter electrode 520 of a P-N-P transistor 522. Base electrode 524 of transistor 522 is electrically connected as at 526 to conductor 500 so as to have resistor 510 effective for biasing transistor 522 whenever contacts 512 are closed. The collector electrode 528 of transistor 522 is connected in series with electrical lead 308 of the winding 304 of the solenoid valve assembly 224 (FIGURES 2, 3 and 9). The other lead 306 of coil 304 is connected to conductor 530 which goes to ground potential as at 532. Transistor 522 is provided in order to extend the life of contacts 512. The main current is thereby carried by the emitter-collector circuit of transistor 522 while contacts 512 need carry only a relatively small current.

The brake operated switch 84 (also see FIGURE 2) has its lead 96 connected, as at 534, to conductor 518 and its other lead 94 connected to one contact of a set of normally open relay-operated contacts 536. Solenoid coil 132, carried by the bellows 104 (also see FIGURE 3) has one of its leads 138 connected to the other contact of the said set of contacts 536 while its other lead 134 is connected to housing 122 which, as explained with reference to FIGURE 3, functions as a contact in cooperation with shoe contact 146 carried by the electrically non-conductive rod 144. Lead 150 is connected to ground potential through conductor 530.

Conductor 370 electrically connects contact 484 to conductor 94 as at 538 between brake switch 84 and the set of relay-operated contacts 536. Similarly, conductor 374 connects contact 486 to conductor 138, at a point 540, between relay contacts 536 and coil 132. A bulb 542 or other sensory device is preferably connected as by conductors 544 and 546 to conductor 134 and 138, respectively, so as to be in parallel with coil or winding 132. Another relay coil 548 is also in parallel with solenoid coil 132 as by conductors 550 and 552 respectively connected to conductors 134 and 138.

The terminal leads 554 and 556 of throttle position feed-back potentiometer 208 are connected by conductors 558 and 560 to conductors 408 and 420, respectively. Contact 562 of potentiometer wiper arm 272 engages the resistance winding 564 while the wiper arm terminal lead 566 is serially connected to conductor 568 and a polarized relay coil 570. The other end of relay coil 570 is connected as by a conductor 572 to conductor 498 leading from the speed signal generator 22. A diode 574 is arranged in parallel to relay coil 570 by means of conductors 576 and 578 being respectively connected to conductors 498 and 568. Diode 574, is of course, provided in order to protect coil 570 against abnormally high stray voltages.

Conductors 368 and 498, respectively connected to speed signal generator leads 324 and 326, are connected to each other as by a resistor 580 and capacitors 582 and 584 so as to have the resistor and capacitors in parallel to the output leads 324 and 326 of speed signal generator 22. Capacitors 582 and 584 provide a filter network for speed signal generator 22.

In the schematic wiring diagram of FIGURE 10, relay 548 controls contacts 458, 460 and 536 while relay 570 controls contacts 512. Energization of the respective relays causes the related contacts to assume conditons opposite to that illustrated.

OPERATION

In describing one mode of operation of the invention, it should be remembered that during periods of engine operation in which the governing system is not in operation: (1) solenoid winding 304 of valve assembly 224 is not energized thereby causing valve member 292 (FIGURE 9) to assume an open position venting the interior 116 of bellows 104 to the atmosphere; (2) bellows 104 being vented to the atmosphere, is fully extended to the right by its internal spring 118 causing housing 122 of the latching solenoid to bear against the solenoid latching shoe 146 which is prevented from further movement to the right by yoke-like abutment 151 (FIGURE 4); and housing 122 and shoe 146 cooperate to function as switching contacts in an electrical circuit.

Let it be assumed that the vehicle equipped with this invention is traveling at 25 miles per hour (m.p.h.) and it is desired to establish a regulated speed of 50 m.p.h. The vehicle operator would first create a request signal by rotating the wiper contact arm 272 (FIGURE 10) as by rotating the thumb wheel 338 (FIGURE 7) until an indicator 342 bearing the number 50 (or some other number such as 5) assumed a position opposite to the pointer end 348 of index member 346. During this time ignition switch 404 (FIGURE 10) is, of course, closed and therefore conductors 410, 436 and 518 are in circuit with the electrical source 400. However, the circuitry of FIGURE 10 is not yet functioning.

Vehicle speed may then be steadily increased by the operator, if desired, by depressing foot throttle pedal 58 (FIGURE 2), thereby causing the throttle valve 43 to become more fully opened. If it is assumed that vehicle speed increases until it reaches 55 m.p.h., as indicated by the speedometer, the vehicle operator may depress plunger 374 of push button switch assembly 334 causing the bridging contact 470 to complete the circuit across contacts 480 and 482 and stimultaneously cause bridging contact 472 to complete the circuit across contacts 484 and 486.

With the push button plunger 374 thusly depressed a circuit is completed from conductor 518, through brake switch 84, through conductor 370, bridging contact 472, conductor 372, latching solenoid winding 132, latching solenoid housing contact 122, latching solenoid shoe member 146, conductor 150 and into ground 532 through conductor 530. Additionally, since bulb 542 and relay 548 are in parallel with latching solenoid winding 132, energization of relay 548 and bulb 542 is simultaneously accomplished. The bulb 542 becoming energized gives the operator a visual indication that the vehicle is in a governed or regulated mode of operation and that the operator may now take his foot off of the throttle pedal 58.

Once the bulb 542 is energized, push button plunger 374 may be released to be resiliently returned to its normal position as shown in FIGURE 10 by the compression spring 474. However, it should be remembered that original energization of relay 548 has caused its related contacts 536 and 458 to become closed and contacts 460 to become opened. Therefore, even though push button plunger 374 by being released causes conductors 370 and 372 to become opened, energization of relay 548, latching solenoid winding 132 and bulb 542 continues because the circuit from conductors 94 to conductor 138 as become closed by virtue of contacts 536 closing.

Transistor 434 is, of course, normally conductive and when push button plunger 374 is returned to the position shown in FIGURE 10, the circuit is completed from conductor 436, emitter-collector of transistor 434, through conductor 444 and that portion of the resistance winding 450 between terminal 356 and potentiometer wiper arm contact 448. This is so because at this time contacts 458 are closed by virtue of relay 548 being energized. Therefore, the circuit is also closed from wiper arm contact 448, through wiper arm 446 of the speed setting or operator request potentiometer 330, contacts 458, conductor 362, bridging contact 470, conductor 364 and conductor 368. As a consequence of this there is a definite positive voltage developed as at point 496 which is of a particular value reflecting the selected or requested regulated speed of 50 m.p.h.

At the same time the vehicle speed sense generator 22 (FIGURES 1, 8 and 10) is being driven by the transmission output shaft at a speed reflective of actual vehicle speed and, as a consequence thereof, develops an output voltage which varies in accordance with vehicle speed. Since it has been assumed that the vehicle has been manually accelerated to a speed of 55 m.p.h. and that a controlled speed of 50 m.p.h. has been requested, it becomes evident that at this time generator 22 output voltage will exceed the voltage signal from the speed setting potentiometer 330. Accordingly, current flow at this time will be from generator 22 output conductor 324 through conductor 368, resistor 494, conductor 364, bridging contact 470, through potentiometer wiper arm contact 448 and eventually into ground 422.

With the operator having released the throttle foot pedal 58, vehicle speed begins to decrease thereby causing the output voltage of speed signal generator 22 to correspondingly decrease. During this time there is no current flow from speed signal generator 22 through polarized relay 570. As vehicle speed approaches the selected controlled vehicle speed of 50 m.p.h., the output of speed signal generator diminishes to a point where it is approximately equal to the voltage signal from the speed selector potentiometer 330.

Assuming now that the vehicle is traveling at a substantially constant road-load condition and is progressing over a relatively straight and flat road at a selected speed of 50 m.p.h., the speed controlling arrangement of this invention maintains the selected vehicle speed by continually causing the vacuum bellows 104 to be intermittently vented to atmosphere and alternately coupled to a source of intake manifold vacuum.

The above action continues to rapidly and minutely repeat itself. That is, in maintaining selected speed the bellows 104 is continually and rapidly being first exposed to manifold vacuum and then to atmosphere in order to achieve a sort of blending of these two pressures in order to maintain the bellows at varying collapsed stages for continually positioning the throttle valve. During these periods of rapid opening and closing of vacuum control valve 292, throttle valve 43 may minutely oscillate plus or minus a half a degree. However, the vehicle does not vary its speed because such changes are relatively rapid and the inertia of the vehicle is too great.

However, if the road-load increases the vehicle speed tends to decrease. As vehicle speed tends to decrease the voltage from the speed selector potentiometer exceeds the voltage from the speed generator 22 and such excess is directed through generator 22 and resistor 580, through conductors 498 and 572, through polarized relay 570, through wiper arm 272 of throttle feed-back potentiometer 208, conductors 560 and 420 and to ground at 422. Current flow through polarized relay 570, in the direction described, causes contacts 512 to close thereby making the emitter-collector circuit of transistor 522 conductive so as to energize solenoid valve assembly winding 304. Energization of coil 304 causes valve member 292 to close against seat 290 (FIGURE 9) thereby causing the interior 116 of bellows to be placed in complete communication, by virtue of conduits 228, 234, 235, 237, 230 and 226 (FIGURES 2, 3 and 9), with the interior of intake manifold 20. Such communication of manifold vacuum to bellows 104 causes end 114 thereof to move to the left (FIGURE 3) and, since shoe 146 is at this time magnetically latched to housing 122, move throttle valve 43 toward the more fully opened position by means of cable 160 which is operatively secured to throttle lever 172 (FIGURES 3, 4 and 5). However, at the same time the wiper 272 of potentiometer 208 is also being correspondingly rotated by virtue of its connection to cable 158 which is also operatively fastened to shoe 146. As the throttle 208 is rotated towards fully opened position, cable 158 rotates potentiometer wiper 272 generally counter-clockwise (as viewed in FIGURE 10). Consequently, as wiper arm 272 is thusly moved, the voltage from conductor 558 increases sufficiently to oppose the further flow of current through polarized relay 570. As soon as current through relay 570 terminates, contacts 512 open causing de-energization of solenoid valve assembly winding 304 which, in turn, permits valve member 292 to move away from seat 290 thereby allowing atmospheric pressure to in some degree enter into conduits 284, 228, 234, 235, 237, 230 and 226 (FIGURES 2, 3 and 9).

The provision of a throttle position feed-back potentiometer 208 is of tremendous benefit in that it greatly increases the sensitivity of the entire speed regulating system by creating a quick feed-back voltage signal, in opposition to the voltage causing current flow through relay 570, which accurately and continuously reflects both throttle valve position as well as changes in the position of throttle valve 43. Without the feed-back potentiometer 208 the vehicle might well have to experience much greater changes in speed in order to develop voltage changes from the speed signal generator 22 sufficient to effect the various components of the system.

Another feature of this invention is the provision of a minimum speed potentiometer 456 (FIGURE 10). As will be noted, the potentiometers 330 and 456 are connected together. Accordingly, if wiper arm 446 of potentiometer were turned to its absolute minimum speed setting, potentiometer 456 would still produce a request signal voltage equivalent to, for example, 30 m.p.h. Potentiometer 456 may, of course, be adjusted for any such minimum speed and it should be made clear that the term minimum speed, in this case means that the vehicle speed control system is rendered incapable of establishing governed or controlled vehicle speed less than the minimum speed determined by the potentiometer 456.

The entire speed control arrangement is rendered inoperative whenever the operator opens contact 88 of switch assembly 88 as by depressing the brake pedal 78 (FIGURES 2 and 10).

Another feature of this invention is the ability of the operator to fully depress push button plunger 374 when the vehicle is traveling at a governed selected speed of, for example, 50 m.p.h. and have the vehicle decelerate to the minimum speed setting determined by potentiometer 456.

It can be seen that if the system (FIGURE 10) is in a governing mode of operation and push button plunger 374 is depressed bridging contact 470 opens the circuit through contacts 476 and 478 but closes the circuit through contacts 480 and 482. Consequently, the speed voltage signal from generator 22 is in excess of that from the minimum speed potentiometer 456 thereby causing current flow from conductor 368 through contact 470, conductor 366, conductor 452, wiper 454 and into ground 422. Since there is no current flow through polarized relay 570 contacts 512 remain open thereby preventing energization of solenoid-operated vacuum control valve assembly winding 304. This, of course, causes the bellows 104 to be ported to atmosphere thereby allowing the throttle valve 43 to move towards closed position. The vehicle continues to decelerate until the push button plunger 374 is released or until such time as the vehicle attains the minimum speed setting dictated by potentiometer 456 at which time the vehicle will continue at this minimum controlled speed setting for as long as the plunger 374 is held depressed. Release of push button plunger 374 to its position illustrated in FIGURE 10 will cause the vehicle to accelerate and once attain the previously established controlled speed of, for example, 50 m.p.h.

The location of push button plunger 374 need not be on the vehicle dash panel or located in the same housing with the potentiometer 330, as illustrated in FIGURES 2 and 7. If desired, the push button switch assembly and the plunger may be incorporated within, for example, the lever for actuating the vehicle turn signal indicator. Such an arrangement is illustrated in FIGURE 2 wherein the turn signal lever 72 is provided at the end thereof with a push button plunger 70.

It will be understood that while a particular mode of operation is set forth herein, other modes of operation are inherent with the speed regulating arrangement. For example, if desired, when the vehicle is traveling at 25–30 miles per hour, for example, the operator may set the thumb wheel 338 until the indicator bearing the number 50 for example, is opposite pointer 348. The plunger 374 may then be depressed and released and the arrangement of this invention will cause throttle valve 43 to open to the position necessary to increase the vehicle speed to 50 miles per hour.

Although only one embodiment of the invention has been disclosed and described, it is apparent that other embodiments and modifications of the invention are possible.

We claim:

1. A speed regulating arrangement for a vehicle having an internal combustion engine with an intake manifold and a throttle valve for controlling the flow of motive fluid to said engine, comprising first manually adjustable means for creating an input signal corresponding to desired regulated vehicle speed, second means for creating a vehicle speed signal corresponding to actual vehicle speed, third means for comparing said input signal against said vehicle speed signal in order to obtain a resultant signal which is the difference therebetween, pressure responsive means for positioning said throttle valve, valve means for at times completing communication between said pressure responsive means and the interior of said intake manifold in order to communicate the vacuum existing within said manifold to said pressure responsive means, fourth means responsive to the existence of said resultant signal for actuating said valve means in order to complete said communication between said pressure responsive means and said interior of said intake manifold in order to cause said pressure responsive means to re-position said throttle valve in accordance with said resultant signal, said first manually adjustable means comprising a first potentiometer connected to a source of electrical potential, said second means comprising an electrical generator driven in accordance with vehicle speed, said third means comprising first electrical circuitary leading from said first potentiometer to said electrical generator, said fourth means comprising an electrical relay, said valve means comprising a solenoid operated valve assembly, said electrical relay being effective for opening and closing a circuit through said solenoid operated valve assembly in accordance with the existence and non-existence, respectively, of said resultant signal, said pressure responsive means comprising a vacuum actuated bellows secured against movement at one end and carrying at its other free end a latching solenoid assembly, said latching solenoid assembly being effective upon energization for operatively coupling said free end to said throttle valve, said bellows being effective when sufficiently exposed to the vacuum within said intake manifold to move said throttle valve toward a more nearly fully opened position, a second potentiometer connected to a source of electrical potential and operatively connected to said throttle valve and said free end of said bellows for creating a feed-back signal corresponding to throttle valve position, and second electrical circuitry for comparing said resultant signal to said feed-back signal, said feed-back signal being effective upon equaling said resultant signal to cause said solenoid operated valve means to become de-energized in order to at least momentarily terminate said communication between said interior of said intake manifold and said vacuum actuated bellows.

2. A speed regulating arrangement according to claim 1, wherein said electrical relay includes a relay winding, and relay-operated contacts adapted to move to a closed position in response to current flow through said relay winding, the arrangement further including means adapted to increase current flow through said relay winding when said relay-operated contacts are moved to a closed position for preventing inadvertent opening of said relay-operated contacts.

3. A speed regulating arrangement for a vehicle having an internal combustion engine with an intake manifold and a throttle valve for controlling the flow of motive fluid to said engine, comprising first manually adjustable means for creating an input signal corresponding to desired regulated vehicle speed, second means for creating a vehicle speed signal corresponding to actual vehicle speed, third means for comparing said input signal against said vehicle speed signal in order to obtain a resultant signal which is the difference therebetween, pressure responsive means for positioning said throttle valve, valve means for at times completing communication between said pressure responsive means and the interior of said intake manifold in order to communicate the vacuum existing within said manifold to said pressure responsive means, fourth means responsive to the existence of said resultant signal for actuating said valve means in order to complete said communication between said pressure responsive means and said interior of said intake manifold in order to cause said pressure responsive means to re-position said throttle valve in accordance with said resultant signal, said first manually adjustable means comprising a first potentiometer connected to a source of electrical potential, said second means comprising an electrical generator driven in accordance with vehicle speed, said third means comprising first electrical circuitry leading from said first potentiometer to said electrical generator, said fourth means comprising an electrical relay, said valve means comprising a solenoid operated valve assembly, said electrical relay being effective for opening and closing a circuit through said solenoid operated valve assembly in accordance with the existence and non-existence, respectively, of said resultant signal, and said pressure responsive means comprising a vacuum actuated bellows secured against movement at one end and carrying at its other free end a latching solenoid assembly, said latching solenoid assembly being effective upon energization for operatively coupling said free end to said throttle valve, said bellows being effective when sufficiently exposed to the vacuum within said intake manifold to move said throttle valve toward a more nearly fully opened position.

4. A speed regulating arrangement according to claim 3 including fifth means responsive to the position of said throttle valve for creating a feed-back signal corresponding to throttle valve position, said feed-back signal being effective upon equaling said resultant signal to cause said valve means to at least momentarily terminate said communication between said interior of said intake manifold and said pressure responsive means.

5. A speed regulating arrangement according to claim 3 wherein said electrical relay includes a relay winding, and relay-operated contacts adapted to move to a closed position in response to current flow through said relay winding, the arrangement further including means adapted to increase current flow through said relay winding when said relay-operated contacts are moved to a closed position for preventing inadvertent opening of said relay-operated contacts.

References Cited

UNITED STATES PATENTS

| | | | |
|---|---|---|---|
| 2,225,206 | 12/1940 | Cassels | 180—109 |
| 2,755,877 | 7/1956 | Kelem | 180—109 |
| 3,127,734 | 4/1964 | Frick | 123—103 |
| 3,171,394 | 3/1965 | Beegle | 123—102 |
| 3,340,952 | 9/1967 | Day | 180—109 XR |
| 3,348,625 | 10/1967 | Thorner | 123—103 |
| 3,381,771 | 5/1968 | Granger | 123—102 |

MEYER PERLIN, *Primary Examiner.*

U.S. Cl. X.R.

123—103